Aug. 16, 1932.  G. W. FOSTER  1,872,436
WORK FEEDING APPARATUS
Filed Nov. 2, 1929  3 Sheets-Sheet 2

INVENTOR
GEORGE W. FOSTER.
BY
J. King Harness
ATTORNEY

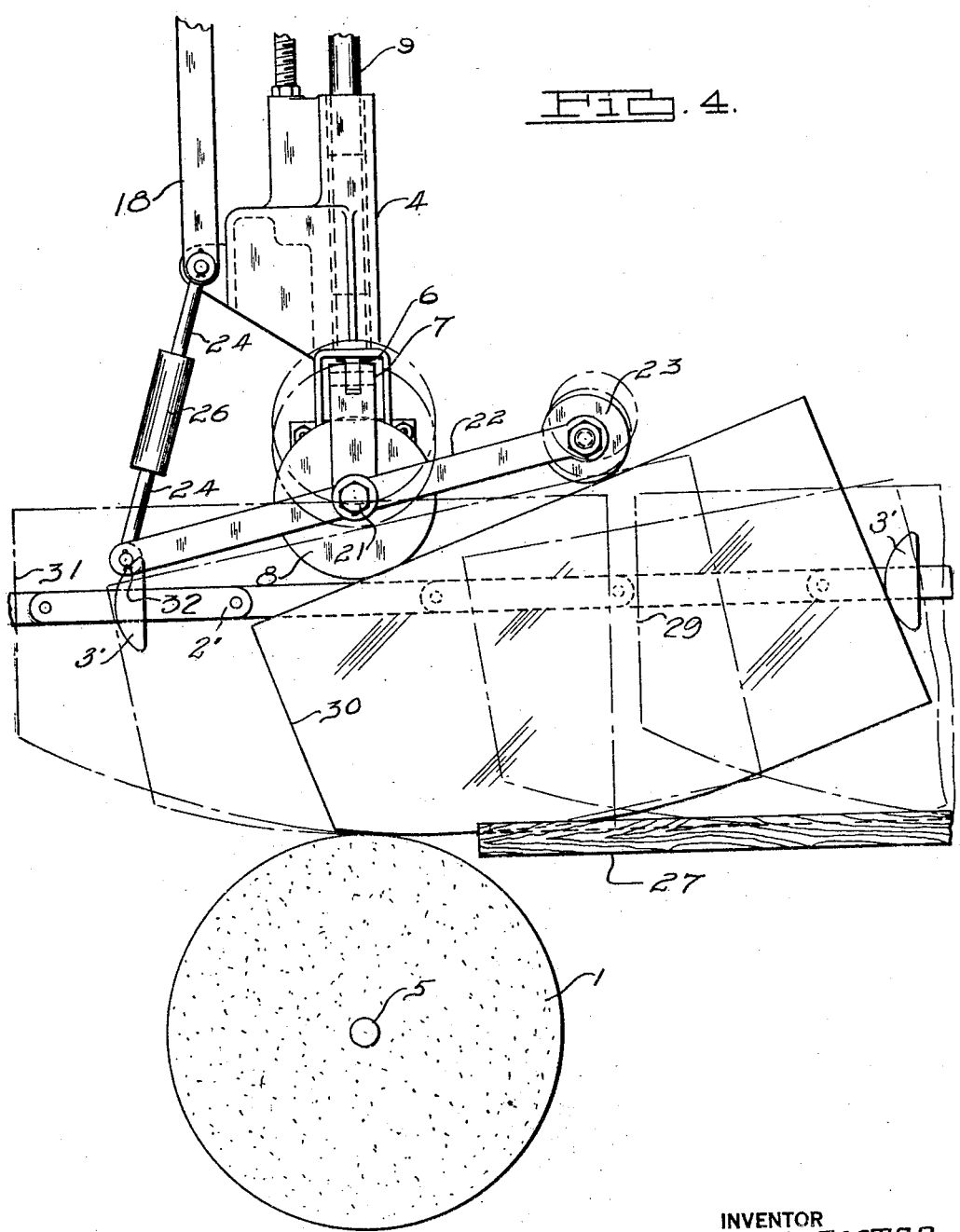

Patented Aug. 16, 1932

1,872,436

UNITED STATES PATENT OFFICE

GEORGE W. FOSTER, OF DETROIT, MICHIGAN, ASSIGNOR TO CHRYSLER CORPORATION, OF DETROIT, MICHIGAN, A CORPORATION OF DELAWARE

WORK FEEDING APPARATUS

Application filed November 2, 1929. Serial No. 404,471.

This invention relates to an improved apparatus for feeding pieces of work to a rotary tool.

The main objects of this invention are to provide improved mechanism for subjecting curved surfaces, particularly edges, of pieces of work to the action of a tool; to provide a device of this kind which is adapted to successively urge adjacent curved and linear edge portions of pieces of work against the working surface of a tool during a single feeding of the work to the tool; to provide an improved means for urging all parts of the surfaces being worked upon against the tool with a substantially uniform pressure; to provide a yieldable feeding mechanism for accommodating pieces of work of various sizes and diverse curvatures; to provide an improved method for subjecting pieces of work to the action of a tool, whereby the curvature of the surfaces being worked upon predetermines the position of the work relative to the tool; and to provide a feeding apparatus of this kind which may be conveniently installed on machines of standard construction.

An illustrative embodiment of my invention is shown in the accompanying drawings, wherein:

Fig. 3 is a section taken on line 3—3 of Fig. 2.

Fig. 4 is a fragmentary front elevation illustrating the successive positions in which a piece of work is disposed during a single feeding operation.

Figure 1:
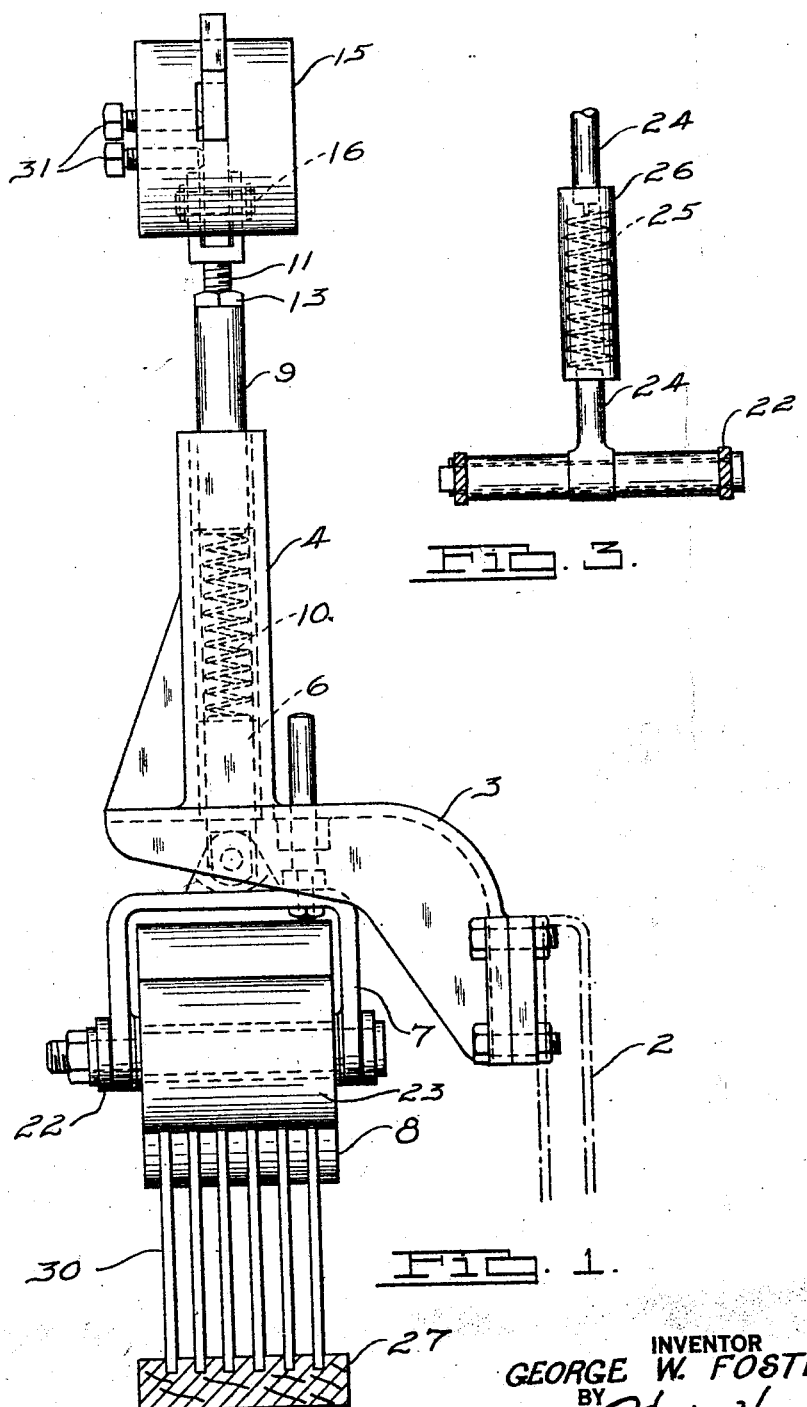
Fig. 1 is a front elevation of my improved work feeding device.

Heretofore, in working upon the edges of articles having adjacent curved and linear edge portions, it has been necessary to feed the articles through the machine under the pressure of a roll adjusted to urge the straight edge portions against the tool, and to subsequently rock the curved edge portions of the article upon the working surface of the tool by a manual operation. This method consumes considerable time and requires the services of skilled workmen.

In the form shown, my improved work feeding device comprises a bracket in which is slidably mounted a pressure roll having its axis substantially in line with the axis of a rotary tool. The pressure roll is resiliently urged toward the tool by means comprising a spring and shiftable plungers which are adapted to apply a substantially uniform force on the roll regardless of its position relative to the tool. Pivotally mounted on the pressure roll is a guide member which extends in advance of the tool for bearing down upon the articles being worked upon at a point remote from the tool so as to rotate the articles relative to the tool when the curved edges of the articles are in engagement with the tool. A stationary work support is provided for arresting rotation of the work when the straight edge portions thereof are in contact with the tool.

For the purpose of illustrating a specific embodiment of my invention, the device shown in the drawings will be described as an auxiliary part of a glass grinding machine of standard construction comprising a grinding tool 1, a supporting frame 2 and a conveyor 2' having lugs 3' for pushing the glass along the support. Mounted on the supporting frame 2 of the grinding machine is a bracket 3 comprising an upright tubular part 4 which is located substantially over the axes 5 of the grinding wheel. Slidably mounted in the lower end of the tubular member 4 is a plunger 6 on which is pivoted a yoke 7. A pressure roll 8 is rotatably supported between the sides of the yoke 7. The upper end of the tubular member 4 is provided with a plunger 9 which is seated on a spring 10, located between the adjacent ends of the upper and lower plungers 6 and 9 respectively. The pressure roll, spring and plungers are shiftable axially of the tubular member 4 as a unit for accommodating plates of glass 30 of various sizes.

Threaded in the top end of the plunger 9 is a bolt 11 on which is mounted a yoke 12. The bolt 11 may be located in any desired position by the set nut 13. A weighted arm 14 comprising an adjustable weight 15 having set bolts 31, is pivotally mounted at 16 on the yoke 12. The left end of the arm 14 is pivoted at 17 to a link 18 which is pivotally mounted on a flange 19 of the upright part 4, by a pin 20. The weighted arm 14 urges the plunger 9 downwardly causing it to bear upon the spring 10 with a substantially uniform force regardless of the position of the plungers, for when the pressure roll 8 is raised the springs and both plungers are elevated as a unit without varying the compression of the spring 10.

Figure 2:
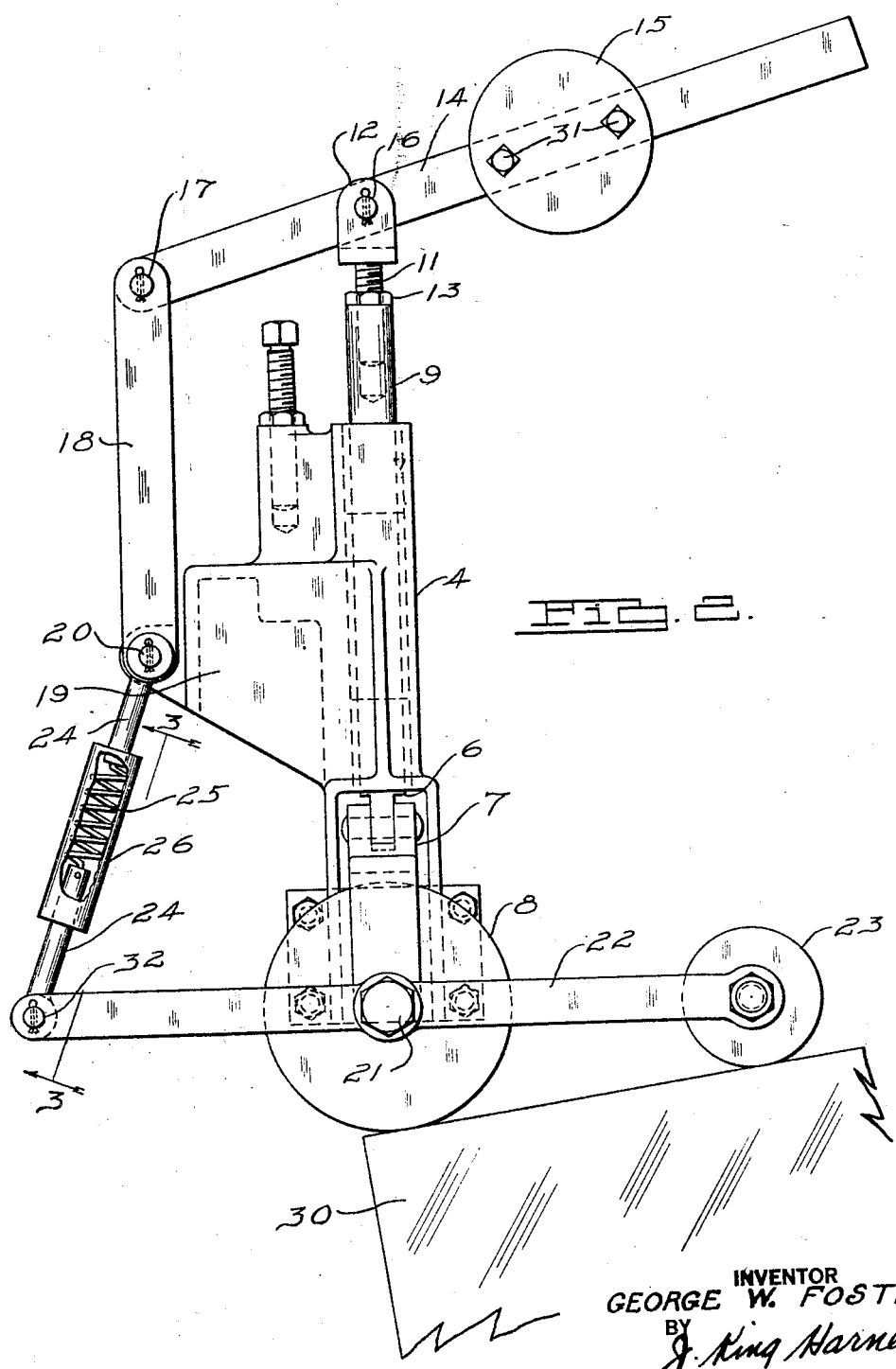
Fig. 2 is a side elevation of the device shown in Fig. 1.

Pivotally mounted on the axle 21 of the roll 8 is a yoke 22 on which is journaled a guide roll 23 which is substantially parallel to, and slightly smaller than the pressure roll 18. The left end of the yoke 22, as viewed in Fig. 2, is pivotally secured at 32 to a contracting link which comprises a pair of plungers 24, a tension spring 25 and a sleeve 26, the upper plungers being mounted on the pin 20 of the flange 19. The plungers 24 extend into the ends of the sleeve 26 and are rigidly secured to the extremities of the spring 25 which normally tends to draw the plungers together and rotate the guide roll 23 downwardly.

In operation, a plurality of pieces of work, which in this instance are represented as consisting of plates of glass having edges which comprise a curved portion and an adjacent substantially straight portion, are placed upon a stationary work support 27 and moved in the direction of the grinding wheel 1 by hand or by suitable pushing apparatus. The support is provided with a plurality of adjacent grooves 28 for receiving the bottom edges of the plates. When the plates of glass reach the position shown by dotted lines 29, they commence to pass under the guide roll 23 which urges the forward ends of the plates downwardly causing them to rock upon their curved edge portions. Further leftward movement of the plates places them in the position indicated by lines 30 where the pressure roll 8 forces the tip of the curved edge portions against the periphery of the wheel 1. As the plates are moved still farther to the left, as viewed in Fig. 4, the guide roll 23 causes them to be rocked upon their curved edge portions relative to the wheel 1. In this manner the full lengths of the curved edge portions of the plates are uniformly subjected to the action of the wheel 1. By the time the plates of glass reach the position shown by dotted lines 31, the entire curved edge portions have been ground and the straight edge portions are about to engage the wheel. The guide roll 23 holds the straight edge portion firmly against the stationary work support 27 while the grinding operation is completed by feeding the remaining lengths of the pieces of glass through the machine.

The spring 10 acting through the yoke 7 and plunger 6 determines the intensity of the force with which the pressure roll 8 urges the work against the grinding wheel. The compression of this spring is maintained substantially uniform for all positions of the roll 8 by the slidably mounted weighted plunger 9 and in this manner the pressure by which both the straight and curved portions of the work are applied to the grinding wheel is maintained substantially constant.

With the above feeding mechanism, the curvature of the edge of the articles being worked upon predetermines their positions relative to the grinding wheel without requiring careful and painstaking manual operation. The pressure roll 8 shifts vertically to correspond with varying widths of the pieces of glass but it always applies a uniform pressure.

Although but one specific embodiment of this invention has herein been shown and described, it will be understood that various changes including the size, shape and arrangement of parts, may be made without departing from the spirit of my invention and it is not my intention to limit its scope other than by the terms of the appended claims.

I claim:

1. The combination with a device comprising a supporting frame and a rotary tool, of mechanism mounted on said frame for pressing a surface of a piece of work upon said tool during relative movement of the tool and work including a shiftable pressure roll adapted to move relative to said tool for accommodating work of irregular shape, means for applying substantially uniform pressure on said roll in all its positions, and means mounted on said mechanism for rocking said work relative to said tool when an intersection of diverging surfaces of said work is in contact with said tool.

2. The combination with a device comprising a supporting frame and a rotary tool, of mechanism mounted on said frame for applying a piece of work to said tool during relative movement of said work and tool including a shiftable pressure roll adapted to move relative to said tool for accommodating work of irregular shape, and means mounted on said mechanism for rocking said work relative to said tool when an intersection of diverging surfaces of said work is in contact with said tool.

3. The combination with a device comprising a supporting frame and a rotary tool, a bracket mounted on said frame, a work support on said frame in advance of said tool, a plunger slidably mounted on said bracket, a yoke pivotally mounted on said plunger, a roll journaled on said yoke, means shiftably mounted on said bracket for resiliently urging said roll toward said tool with a substantially uniform force in all positions of said roll, a second yoke pivotally mounted on said roll, a guide roll on one end of said second yoke located above said work support, and means mounted on said bracket and secured to said second yoke for resiliently urging pieces of work toward said support.

4. An apparatus for feeding work having curved and planular surfaces to a rotary tool, a substantially horizontal work support located in a plane substantially tangent to the periphery of said tool, a bracket above said tool, a vertically shiftable pressure roll mounted on said bracket in spaced relation to said tool for urging pieces of work against said tool, arms pivotally mounted on said pressure roll, and a guide roll on said arms located above said support for rocking pieces of work relative to said tool, said guide roll being adapted in conjunction with said work support to retain the planular edges of said work substantially tangent to the periphery of said tool.

5. The combination with a glass grinding machine comprising a rotary grinding wheel, of a work support having a plurality of grooves for guiding adjacently arranged plates of glass, a bracket on said machine, means slidably mounted on said bracket for urging plates of glass against the periphery of said wheel, said means being shiftable for accommodating pieces of glass of irregular shapes, correspondingly shiftable apparatus for applying uniform pressure on said means in all positions thereof, and a guide member pivotally mounted on said shiftable means for urging the forward ends of said plates of glass toward said work support so as to rock said plates relative to said grinding wheel when arcuate edges are in engagement with said wheel.

6. In a machine including a work table and a tool having a working edge in close proximity thereto, a support located adjacent said work table, a contact member shiftably mounted on said support and adapted to engage a surface of a piece of work having an opposite curved surface seated upon said work table so as to rock the leading end of said curved surface towards said tool during movement of the work along said table, and yieldable means for rocking said work upon said tool in an opposite direction after the leading end of said work is applied thereto.

7. In a machine including a work table and a tool having a working edge in close proximity thereto, a support located adjacent said work table, a contact member shiftably mounted on said support and adapted to engage a surface of a piece of work having an opposite curved surface seated upon said work table so as to rock the leading end of said curved surface towards said tool during movement of the work along said table, apparatus for urging said contact member against said work including a shiftable element adapted to apply substantially the same pressure on said member in all of its various positions, and yieldable means for rocking said work upon said tool in an opposite direction after the leading end of said work is applied thereto.

8. In a glass grinding machine including a work table and a rotary grinding wheel having a surface in close proximity to said work table, a support located adjacent said table, and a contact member shiftably mounted on said support and adapted to engage an edge of a piece of glass having an opposite curved edge seated on said work table so as to rock the leading end of said curved edge towards said tool during movement of the glass along said table, and yieldable means for rocking said glass upon said grinding wheel in an opposite direction after the leading edge of said glass is applied to said wheel.

9. In a glass grinding machine including a work table and a rotary grinding wheel having a surface in close proximity to said work table, a support located adjacent said table, and a contact member shiftably mounted on said support and adapted to engage an edge of a piece of glass having an opposite curved edge seated on said work table so as to rock the leading end of said curved edge towards said tool during movement of the work along said table, shiftable means for urging said contact member against the edge of said piece of glass with substantially the same pressure when said contact member is in various positions, and yieldable means for rocking said glass upon said grinding wheel in an opposite direction after the leading end of said glass is applied to said wheel.

GEORGE W. FOSTER.